(12) United States Patent
Ishibashi

(10) Patent No.: US 8,760,110 B2
(45) Date of Patent: Jun. 24, 2014

(54) ELECTRICITY DISTRIBUTION SYSTEM AND ELECTRICITY DISTRIBUTION METHOD

(75) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 13/298,547

(22) Filed: Nov. 17, 2011

(65) Prior Publication Data

US 2012/0139472 A1 Jun. 7, 2012

(30) Foreign Application Priority Data

Dec. 3, 2010 (JP) ................................ P2010-270439

(51) Int. Cl.
*H02J 7/00* (2006.01)
(52) U.S. Cl.
USPC ............................................ 320/101; 320/109
(58) Field of Classification Search
USPC .......................................................... 320/101
See application file for complete search history.

(56) References Cited

U.S. PATENT DOCUMENTS

| | | | | |
|---|---|---|---|---|
| 5,886,953 | A * | 3/1999 | Kawahara et al. | 368/66 |
| 5,950,171 | A * | 9/1999 | Madell | 705/7.29 |
| 6,222,347 | B1 * | 4/2001 | Gong | 320/137 |
| 8,378,627 | B2 * | 2/2013 | Asada et al. | 320/109 |
| 2001/0025209 | A1 * | 9/2001 | Fukui et al. | 700/291 |
| 2004/0108839 | A1 * | 6/2004 | Stone et al. | 320/137 |
| 2006/0016189 | A1 * | 1/2006 | Johnson | 60/651 |
| 2010/0191487 | A1 * | 7/2010 | Rada et al. | 702/60 |
| 2010/0300130 | A1 * | 12/2010 | Shoenfeld et al. | 62/129 |
| 2011/0025263 | A1 * | 2/2011 | Gilbert | 320/108 |

FOREIGN PATENT DOCUMENTS

JP 09-084146 3/1997

* cited by examiner

*Primary Examiner* — Arun Williams
(74) *Attorney, Agent, or Firm* — Sherr & Jiang, PLLC

(57) ABSTRACT

An electricity distribution system includes an electricity supply control unit that receives information on power consumption, estimates the current and the future power consumption, and controls the supply of electricity to the electric device; an information display unit that displays information on a power use situation of an electric device electrically connected with the electricity supply control unit; and a battery server that accumulates power, in which the electricity supply control unit communicates the information on the power consumption with a new electric device when the new electric device is electrically connected, and when the amount of available power is exceeded by supplying electricity to the electric device, does not supply electricity to the electric device, makes the information display unit display that the amount of available power is exceeded by supplying electricity to the information display unit, and determines whether to use the power accumulated in the battery server.

7 Claims, 7 Drawing Sheets

ELECTRICITY DISTRIBUTION SYSTEM AND ELECTRICITY DISTRIBUTION METHOD

BACKGROUND

The present disclosure relates to an electricity distribution system and an electricity distribution method.

At present, power that an electric power company generates at a power station is transmitted to homes businesses, or the like through a public power wiring network. Homes and businesses contract with the electric power company for the use of electricity and the power usage is determined on the basis of the contract. Further, for example, when the amount of current exceeds the amount determined by the contract with the electric power company due to the simultaneous use of a plurality of electric devices in a home, a breaker trips to make electricity unavailable.

For example, a distribution board is installed in the home. The distribution board measures the amount of total current for each area in a plurality of areas in the home. Further, when the capacity is exceeded, the distribution board trips the breaker of the area where the capacity is exceeded. Further, since the amount of total current in a house is measured, when the total capacity of the house is exceeded, the distribution board trips a main breaker to stop the inflow of current into the entire house.

Therefore, when a microwave oven, an electric stove, a dryer, an air conditioner or the like, which consume a large amount of power, are simultaneously used in a home, the amount of current may exceed the amount determined by the contract with the electric power company and the breaker may trip.

SUMMARY

However, in an electricity distribution system of the related art, there is a problem in that it is difficult to quantitatively ascertain how much power is currently used and to what extent which electric products may be used before the breaker trips. Accordingly, there is a problem in that the user has to rely on their intuition as to whether the breaker will trip or not.

For example, Japanese Unexamined Patent Application Publication No. 9-84146 discloses a technology that uses a network and prevents a breaker from operating when a user freely turns on/off the appliances in a house without concern for the maximum power consumption determined by the contract with the electricity power company. However, the technology disclosed in Japanese Unexamined Patent Application Publication No. 9-84146 merely outputs a warning message when the power consumption is likely to exceed, or has exceeded, a predetermined value, such that it is difficult to increase/decrease the power usage or automatically control electrically-connected electric devices.

It is desirable to provide a new and improved electricity distribution system and electricity distribution method that can ascertain how much power is currently used and to what extent which electric products may be used before the breaker trips or that can measure an increase/decrease in the amount of available power.

An electricity distribution system according to an embodiment of the present disclosure includes: an electricity supply control unit that receives information on power consumption from an electric device that is electrically connected, estimates the current and the future power consumption, and controls the supply of electricity to the electric device; an information display unit that displays information on a power use situation of the electric device electrically connected with the electricity supply control unit; and a battery server that accumulates power, in which the electricity supply control unit communicates the information on the power consumption with a new electric device when the new electric device is electrically connected, and when the amount of available power is exceeded by supplying electricity to the electric device, does not supply electricity to the electric device, makes the information display unit display that the amount of available power is exceeded by supplying electricity to the information display unit, and determines whether to use the power accumulated in the battery server.

The electricity distribution system may further include a charging/discharging control unit that controls charging/discharging of the battery server, in which the electricity supply control unit controls the charging/discharging control unit to use the power accumulated in the battery server when determining that the amount of available power is exceeded by supplying electricity to the electric device, as a result of communicating the information on the power consumption with a new electric device when the new electric device is electrically connected.

The electricity supply control unit may communicate the information on the power consumption with a new electric device when the new electric device is electrically currently connected, and start to supply electricity to a new electric device when the amount of available power is not exceeded even though the power consumption of the electric device electrically connected is decreased and electricity is supplied to the new electric device, when the amount of available power is exceeded by supplying electricity to the electric device.

The electricity supply control unit may communicate the information on the power consumption with a new electric device when the new electric device is electrically connected, and perform control for decreasing the power consumption of the electric device currently electrically connected, when the amount of available power is exceeded by supplying electricity to the electric device.

The battery server may accumulate power generated by a power generator that generates electricity, using natural energy.

A plurality of power generators may be included and the power generators may each be equipped with a boosting device making the power generated from the plurality of power generators uniform at predetermined power.

An electricity distribution method according to another embodiment of the present disclosure includes: receiving information on power consumption from an electric device that is electrically connected, estimating the current and the future power consumption, and controlling the supply of electricity to the electric device; and displaying information that displays information on a power use situation of the electric device electrically connected with the electricity supply control unit; in which, in the controlling of the supply of electricity, the information on the power consumption is communicated with a new electric device when the new electric device is electrically connected, and, when the amount of available power is exceeded by supplying electricity to the electric device does not supply electricity to the electric device, displays that the amount of available power is exceeded by supplying electricity in the displaying of information, and determines whether to use power accumulated in the battery server that accumulates power.

According to the present disclosure described above, it is possible to provide new and improved electricity distribution system and electricity distribution method that can ascertain how much power is currently used and to what extent which electric products can be used before that the breaker operates or can measure an increase/decrease in the amount of available power.

DETAILED DESCRIPTION OF EMBODIMENTS

Figure 1:
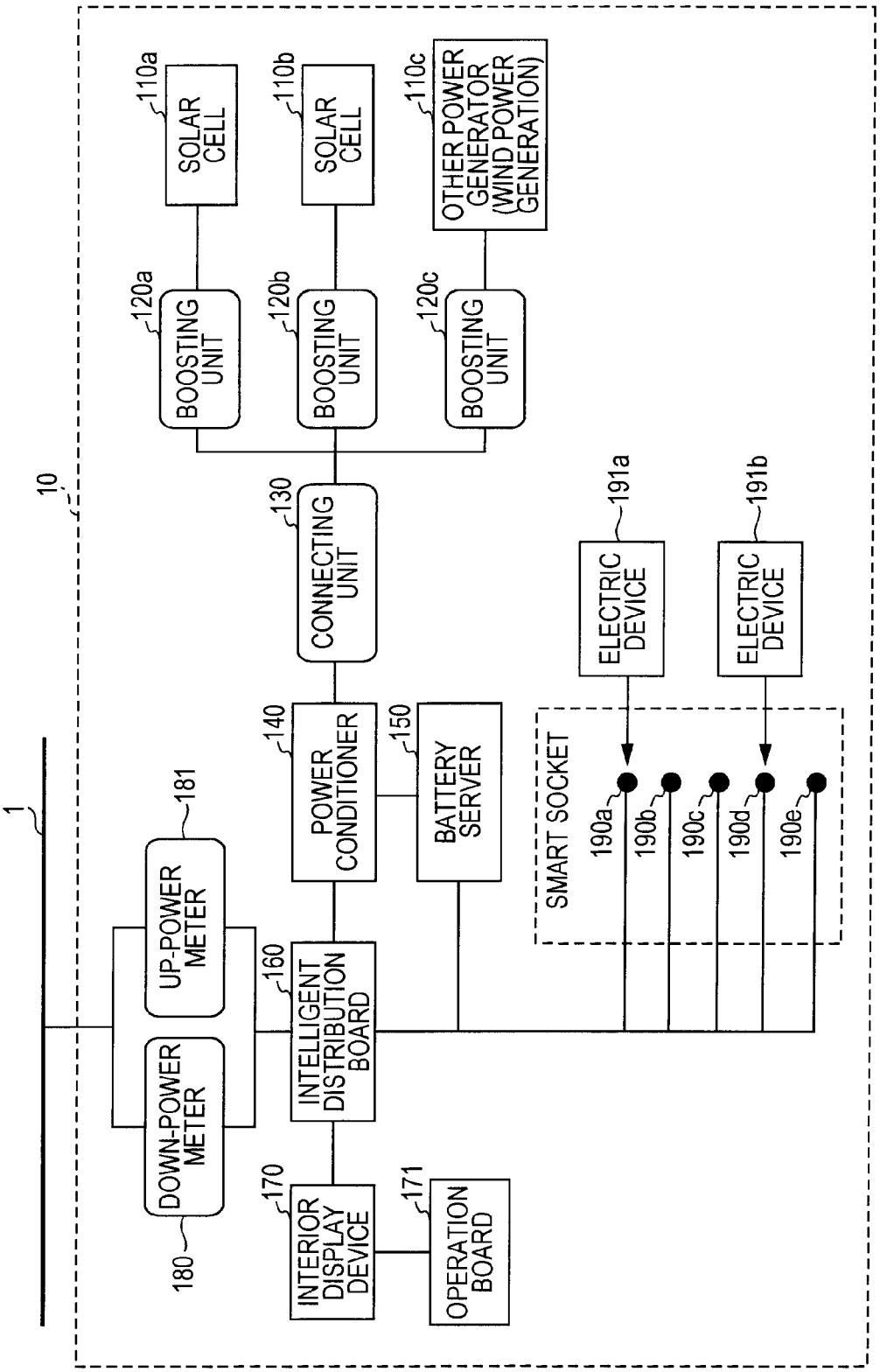
FIG. 1 is an illustrative diagram showing an exemplary configuration of an electricity distribution system according to an embodiment of the present disclosure.

Hereinafter, preferable embodiments of the present disclosure will be described in detail with reference to the accompanying drawings.

Further, in the specification and the drawings, like reference numerals are given to components having substantially the same functional configuration and repetitive description is not provided.

Further, description is provided in the following order.
<1. Electricity Distribution System of Related Art>
<2. Embodiment of Present Disclosure>
[2-1. Configuration of Electricity Distribution System]
[2-2. Operation of Electricity Distribution System]
<3. Conclusion>

1. ELECTRICITY DISTRIBUTION SYSTEM OF RELATED ART

Problems of an electricity distribution system of the related art are described first with reference to the drawings, before preferable embodiments of the present disclosure are described.

Figure 7:
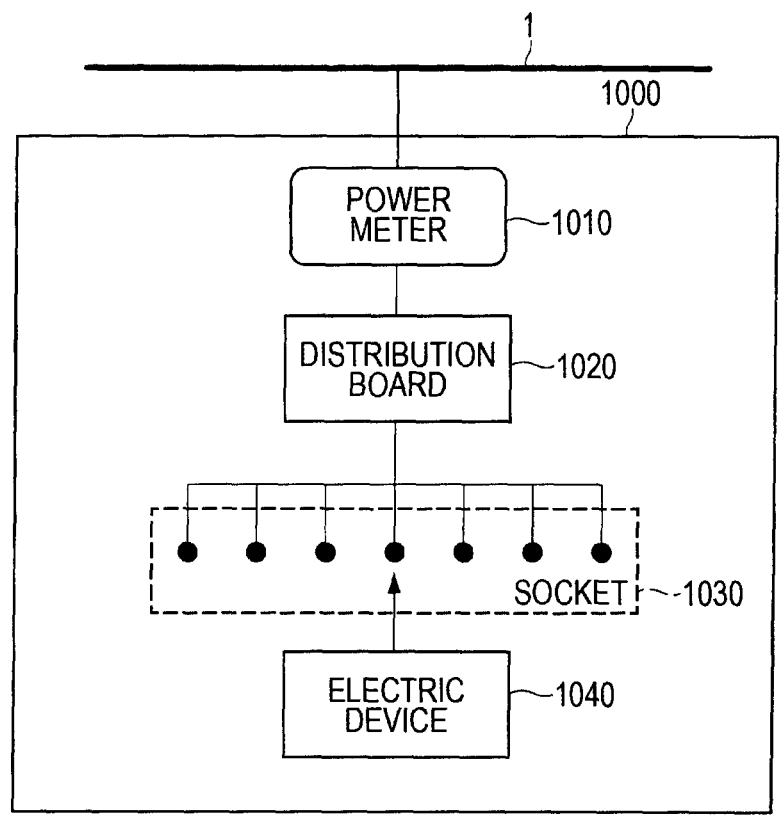
FIG. 7 is an illustrative diagram schematically showing an electricity distribution system of the related art.

FIG. 7 is an illustrative diagram schematically showing an electricity distribution system of the related art. The electricity distribution system of the related art includes, for example, a power meter 1010, a distribution board 1020, and an electric device 1040 operating in electrical connection with a socket 1030. The electricity distribution system of the related art measures the amount of current of power supplied from a public power distribution network 1, using the distribution board 1020, and trips a breaker when the amount of current flowing to a house exceeds a predetermined amount.

Meanwhile, the distribution board 1020 also has a function of measuring the amount of total current for each of a plurality of areas in a home. Further, when the amount of total current of each of the area is exceeded the capacity set for each of the areas, only the breaker of the area where the amount of total current is exceeded is tripped. In this case, the main breaker controlling the flow of current into the entire house is not tripped, but when a predetermined amount is exceeded as a whole, the main breaker trips even though the breakers of the areas do not trip.

However, as described above, in an electricity distribution system of the related art shown in FIG. 7, there is a problem in that it is difficult to quantitatively ascertain how much power is currently used and to what extent which electric products can be used before that the breaker trips. Accordingly, there is a problem in that the user has to rely on their intuition as to whether the breaker will trip or not.

Further, the electricity distribution system of the related art shown in FIG. 7 performs a process of unplugging the sockets and switching the breaker, when the breaker trips. In this case, there is a problem in that the electric devices with the power supply stopped are reset and the content that is being processed is lost. For example, for a microwave oven, when the breaker trips while food is being warmed, the up to date record of for how many minutes the food has been warmed for how many watts is lost, such that it is difficult to continue the work.

In an embodiment of the present disclosure described below, an electric distribution system that can quantitatively ascertain the present power consumption and allows a user to ascertain to what extent which electric products can be used before the breaker trips is described.

Therefore, the user can ascertain to what extent which electric products can be used before the breaker trips, without relying on the user's intuition.

2. EMBODIMENT OF PRESENT DISCLOSURE

2-1. Configuration of Electricity Distribution System

FIG. 1 is an illustrative diagram showing the configuration of an electricity distribution system 10 according to an embodiment of the present disclosure. Hereinafter, an exemplary configuration of the electricity distribution system 10 according to an embodiment of the present disclosure is described by using FIG. 1.

As shown in FIG. 1, the electricity distribution system 10 according to an embodiment of the present disclosure includes a power conditioner 140, a battery server 150, an intelligent distribution board 160, an interior display device 170, an operation board 171, a down-power meter 180, an up-power meter 181, and smart sockets 190a to 190e.

Further, as shown in FIG. 1, the electricity distribution system 10 according to an embodiment of the present disclosure includes solar cells 110a and 110b, another power generator 110c, such as a wind power generator, boosting units 120a, 120b, and 120c, a connecting unit 130, and electric devices 191a and 191b used in connection with the smart sockets 190a to 190e.

The solar cells 110a and 110b are power generators that can generate power by receiving light radiated from the sun. The power generated from the solar cells 110a and 110b is boosted to a predetermined voltage by the boosting units 120a and 120b and transmitted to the connecting unit 130. Although two solar cells 110a and 110b are shown in FIG. 1, the number of solar cells is not limited to the example in the present disclosure. Further, the electricity distribution system 10 may not be provided with a solar cell in the present disclosure.

Further, the electricity distribution system 10 according to an embodiment of the present disclosure, as shown in FIG. 1, may include another power generator 110c using natural energy, such as wind power generation, different from the solar cell, (various energy sources that have difficulty in maintaining the generation of constant power, such as manpower power generation, are included in the "natural energy" of the present disclosure, without being limited to natural energy acquired from solar light or wind force, and it is the same in the following description). The power generated from the power generator 110 is boosted to a predetermined voltage by the boosting unit 120c and transmitted to the connecting unit 130. As energy generation sources, other than the solar cell, solar thermal power generation, a fuel cell, and manpower power generation (pedaling a bicycle or the like) may be considered in addition to the wind power generation.

In the power generated by the solar cells 110a and 110b, power above the usage is sold.

However, the user of the electricity distribution system 10 may not sell the electricity depending on situation of the grid wiring network (for example, a situation where the user purchases a predetermined amount of power and may not buy more than this) In this situation, power generation is stopped or the generated power is wasted in the related art. The power is accumulated in the battery server 150 in the embodiment.

The boosting units 120a, 120b, and 120c boost voltage to a predetermined voltage to make the voltage of the power generated from the solar cells 110a and 110b and the power generator 110c uniform. The power boosted to a predetermined voltage by the boosting units 120a, 120b, and 120c is transmitted to the connecting unit 130.

The connecting unit 130 collectively outputs the power transmitted from the boosting units 120a, 120b, and 120c to the power conditioner 140.

The power conditioner 140 exchanges power with the battery server 150 or the intelligent distribution board 160. The power conditioner 140 may convert the power from direct current into alternating current or from alternating current to direct current, if necessary.

The battery server 150 is equipped with a battery (secondary battery) therein, such that it can be charged by the power generated from the solar cells 110a and 110b, and a power generator 110c or power supplied from the public power wiring network 1. In order to charge the battery server 150 with the AC power supplied from the public power wiring network 1, the power conditioner 140 may convert alternating current into direct current and supply the electricity to the battery server 150.

Further, as an embodiment of the battery server 150, a device only equipped with a battery therein may be possible, and an electric vehicle or an electric motorcycle that can travel, using a battery as a power source, may be possible. The electric vehicle or the electric motorcycle may be used as a home battery server when it is not used.

Further, the battery server 150 may be charged with power at any time when it is possible to receive electricity from the public power wiring network 1, or may be charged at a time, avoiding when most users use power, for example, at night.

The intelligent distribution board 160 measures the power usage in a home and the information on the power usage measured by the intelligent distribution board 160 is appropriately notified to the interior display device 170. Further, the intelligent distribution board 160 receives information on the expected power consumption of electric devices connected to the smart sockets 190a to 190e, from the smart sockets 190a to 190e. The intelligent distribution board 160 can output the information received from the smart sockets 190a to 190e to the interior display device 170.

As described above, as the intelligent distribution board 160 acquires the information on the current power usage and the expected power consumption of the electric devices connected to the smart sockets 190a to 190e and transmits the acquired information to the interior display device 170, the user can see the information displayed on the interior display device 170 and quantitatively ascertain the current power usage and ascertain to what extent which electric product can be used before tripping the breaker.

The interior display device 170 displays the information on the current power usage and the expected power consumption of the electric devices connected to the smart sockets 190a to 190e, which is transmitted from the intelligent distribution board 160. Information displayed by the interior display device 190 is described in detail below.

Further, the intelligent distribution board 160 and the interior display device 170 may be connected by a wire or wirelessly. Further, although it is described the display device that displays the information on the current power usage and the expected power consumption of the electric devices is installed in a house in the embodiment, the present disclosure is not limited to the example. The display device that displays the information on the current power usage and the expected power consumption of the electric devices may be disposed outside.

The operation board 171 is provided, for example, integrally with the interior display device 170 and gives an instruction of distribution control to the intelligent distribution board 160. For example, when electric devices are connected to the smart sockets 190a to 190e and the electric devices start to operate, and when the amount of power due to the operation of the electric devices exceeds the amount of power in the contract, the user operates the operation board 171 and can control the operation board such that supply of electricity from the intelligent distribution board 160 is stopped in the electric system where the electric devices are connected or such that power is output from the battery server 150, when power is accumulated in the battery server 150.

Further, the operation board 171 may be implemented integrally with the interior display device 170 by providing the interior display device 170 with a touch panel function.

The down-power meter 180 is a meter that measures power transmitted from the public power wiring network 1. When the user uses power transmitted from the public power wiring network 1, the down-power meter 180 performs a settlement process on the basis of the amount of power measured by the down-power meter 180.

The up-power meter 181 is a meter that measures power transmitted from the intelligent distribution board 160 to the public power wiring network 1. When the user sells power by transmitting the power to the public power wiring network 1, a settlement process is performed on the basis of the amount of power measured by the up-power meter 181.

The smart sockets 190a to 190e are sockets (plug receivers) having an information communication function, in addition to the general power supply function, and can communicate information between the electric devices and the intelligent distribution board 160 when the corresponding electric devices are connected to the smart sockets 190a to 190e.

Further, it is preferable that the smart sockets 190a to 190e have a shape different from the existing sockets in order to prevent the mistaken insertion of the plugs of electric devices that do not correspond to smart sockets. Further, in this configuration, the detailed shape of the smart sockets 190a to 190e is not specifically stated.

Obviously, the smart sockets 190a to 190e may have a shape that can receive insertion of the plugs of the electric devices that do not correspond to smart sockets. In this case, even if the plugs of the electric devices that do not correspond to smart sockets are inserted in the smart sockets 190a to 190e, information is obviously not communicated between the electric devices and the intelligent distribution board 160.

Further, the plugs of the electric devices that do not correspond to smart sockets may be inserted in the existing sockets (plug receivers). Even in this case, obviously, information is not communicated between the electric devices and the intelligent distribution board 160.

The electric devices 191a and 191b are electric devices corresponding to smart sockets and it is possible to communicate information with the intelligent distribution board 160 by inserting the plugs into the smart sockets 190a to 190e.

The intelligent distribution board 160 automatically supplies electricity to the electric devices 191a and 191b when it is determined that electricity can be distributed to the electric devices 191a and 191b connected to the smart sockets 190a to 190e. However, when it is determined that power is insufficient, the intelligent distribution board 160 warns of insufficient power through the interior display device 170 and does not supply electricity to the electric devices 191a and 191b connected to the smart sockets 190a to 190e. Further, when electricity is not supplied to the electric devices 191a and 191b connected to the smart sockets 190a to 190e, and when it becomes possible to allow electricity to automatically flow to the electric devices 191a and 191b after a predetermined time passes, it is notified when electricity can be supplied, through the interior display device 170. When it becomes possible to automatically supply electricity to the electric devices 191a and 191b after the predetermined time passes may be, for example, when a microwave oven finishes warming food or a washing machine finishes washing.

The information transmitted from the electric devices 191a and 191b to the intelligent distribution board 160 may be, for example, information on the operational states of the electric devices, other than the information on the expected power consumption described above. The operational state of the electric devices may be the time or the watt value taken to warm food, for example, when the electric device is a microwave oven, or a situation in which washing is proceeding, for example, when the electric device is a washing machine.

The configuration of the electricity distribution system 10 according to an embodiment of the present disclosure was described above. The flow of power in the electricity distribution system 10 according to an embodiment of the present disclosure shown in FIG. 1 is described.

Figure 2:
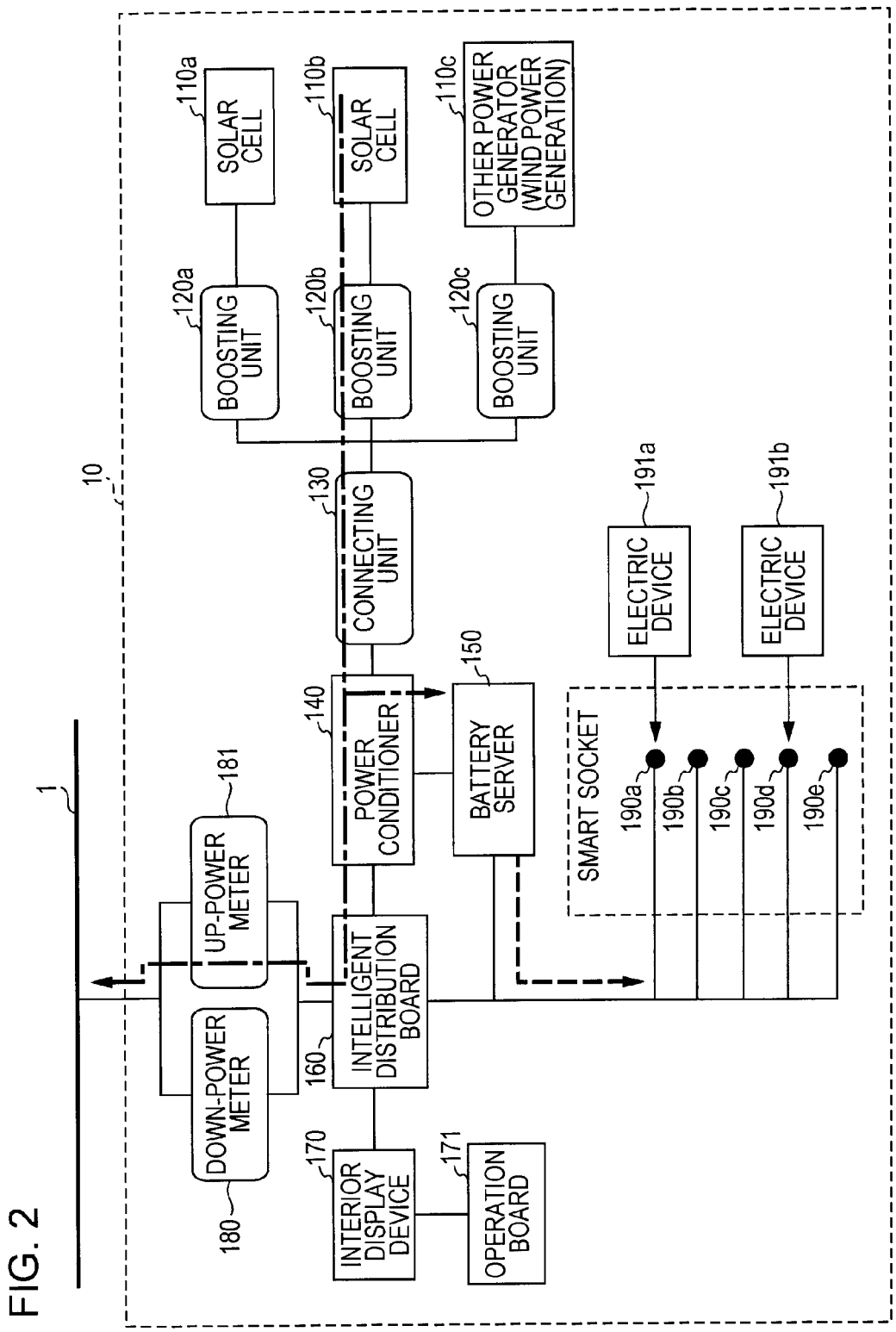
FIG. 2 is a diagram showing the flow of power of the electricity distribution system according to an embodiment of the present disclosure.

FIG. 2 shows the flow of power when power generated from the solar cells 110a and 110b or another power generator 110c is output to the public power distribution network 1 to sell or be stored in the battery server 150.

In the electricity distribution system 10 according to an embodiment of the present disclosure, it is possible to use an off-grid power system using natural energy, such as photovoltaic generation or wind power generation and accumulate a portion of remaining power in the battery server 150. Obviously, in the present disclosure, the entire power generated by the off-grid power system may be sold. Further, the battery server 150 may be charged with inexpensive night grid power.

Figure 3:
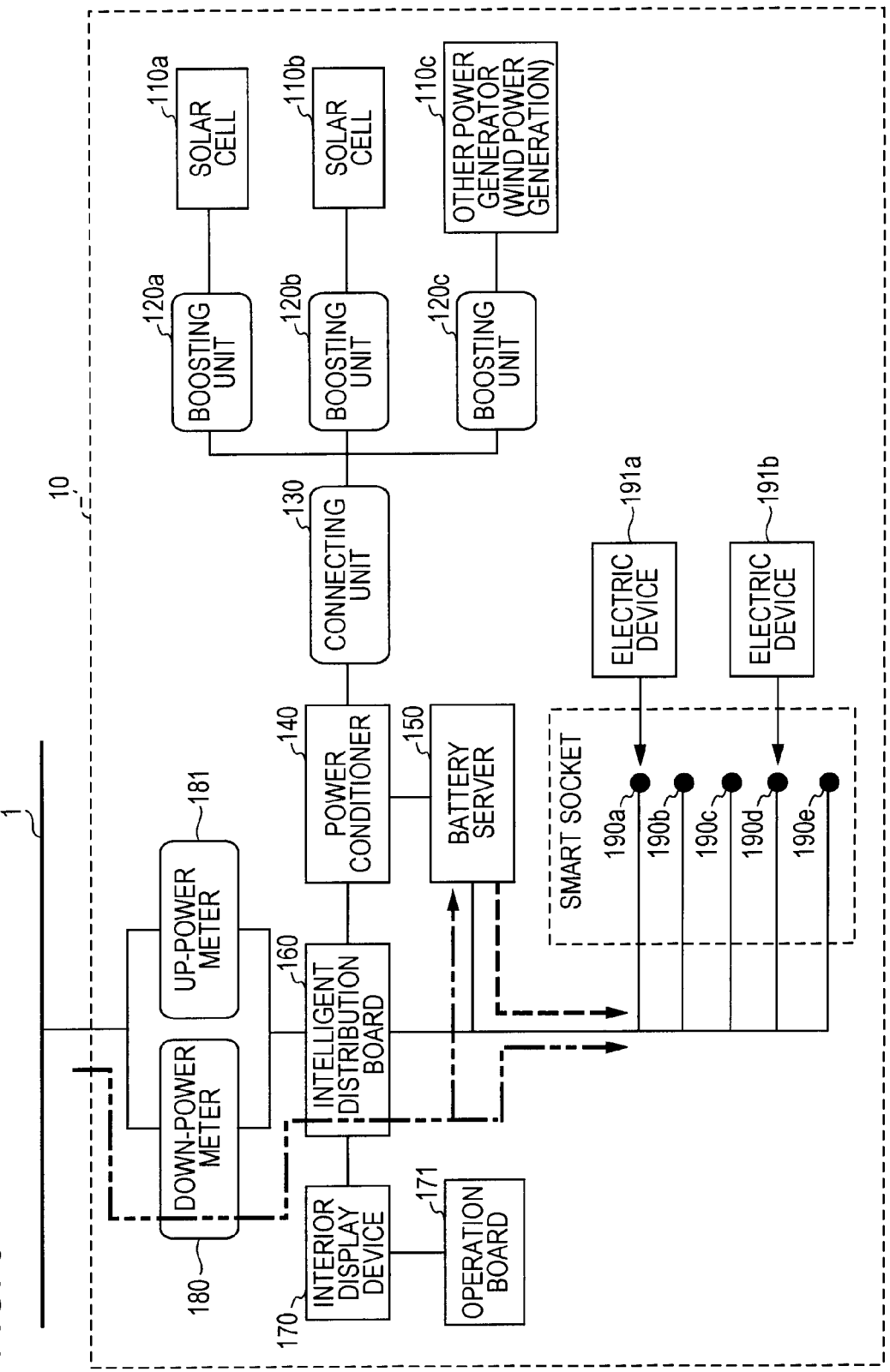
FIG. 3 is a diagram showing the flow of power of the electricity distribution system according to an embodiment of the present disclosure.

FIG. 3 shows the flow of power when power supplied from a power station through the public power wiring network 1 is supplied to the electric devices 191a and 191b through the intelligent distribution board 160 and the smart sockets 190a to 190e.

In the electricity distribution system 10 according to an embodiment of the present disclosure, it is possible to store the power, which is supplied from a power station through the public power wiring network 1, to the battery server 150. Obviously, in the present disclosure, the power supplied from a power station through the public power wiring network 1 may be supplied to the electric devices 191a and 191b, directly through the intelligent distribution board 160 and the smart sockets 190a to 190e. Further, the power may be supplied from the battery server 150 to the electric devices 191a and 191b through the smart sockets 190a to 190e, if necessary, when the contract power consumption is exceeded the expected power consumption.

The flow of power in the electricity distribution system 10 according to an embodiment of the present disclosure was described above. Next, the operation of the electricity distribution system 10 according to an embodiment of the present disclosure is described in detail.

As described above, when electric products are connected to the smart sockets 190a to 190e, the expected power consumption is notified. The intelligent distribution board 160 (or the power conditioner 140 or a device integrally equipped with the power conditioner 140 and the intelligent distribution board 160) receiving the notification calculates the future expected power consumption and displays it on the interior display device 170.

Meanwhile, when the electric devices are connected to not the smart sockets, but existing sockets, it is difficult to calculate the future expected power consumption, such that it is reflected in the future expected power consumption that the current power consumption is maintained.

In the electricity distribution system 10 according to an embodiment of the present disclosure, a case where new electric devices that exceed the contract power consumption are connected to the smart sockets 190a to 190e is considered. In this configuration, the display warns with a sound or a screen. The warning says that when electricity is supplied to the connected electric devices, the contract amount of power is exceeded and the breaker trips as well as how long it will take to be able to supply electricity.

In practice, although the contract amount of power consumption is exceeded at the present time, it may go under the contract amount after waiting for a predetermined time. For example, although a microwave oven or an electric rice cooker consumes a large amount of power for a period of time, generally, the power consumption is greatly reduced after the process is finished. When the process is finished, the contract power consumption may not be exceeded even if electricity is supplied to a newly connected device.

Meanwhile, nevertheless, in order to use the device, the power accumulated through the power conditioner 140 or directly to the battery server 150 may be used by an instruction from the user, or an instruction is given in advance to the intelligent distribution board 160 such that the power accumulated in the battery server 150 is automatically used. As described above, since the power accumulated in the battery server 150 is used, the user may be prevented from paying a high basic contract fee for using a large amount of power, which is made with a power company.

Further, it may be possible to supply electricity to a newly connected electric device, by controlling the power consumption of other electronic devices. For example, it does not matter even if the power consumption is reduced by temporarily adjusting temperature or the like, for example, for a refrigerator or an air conditioner. For the devices described above, it may be possible to primarily distribute electricity to the connected devices by suppressing the power consumption for a predetermined time. This may be performed automatically or by a user's instruction.

Figure 4:
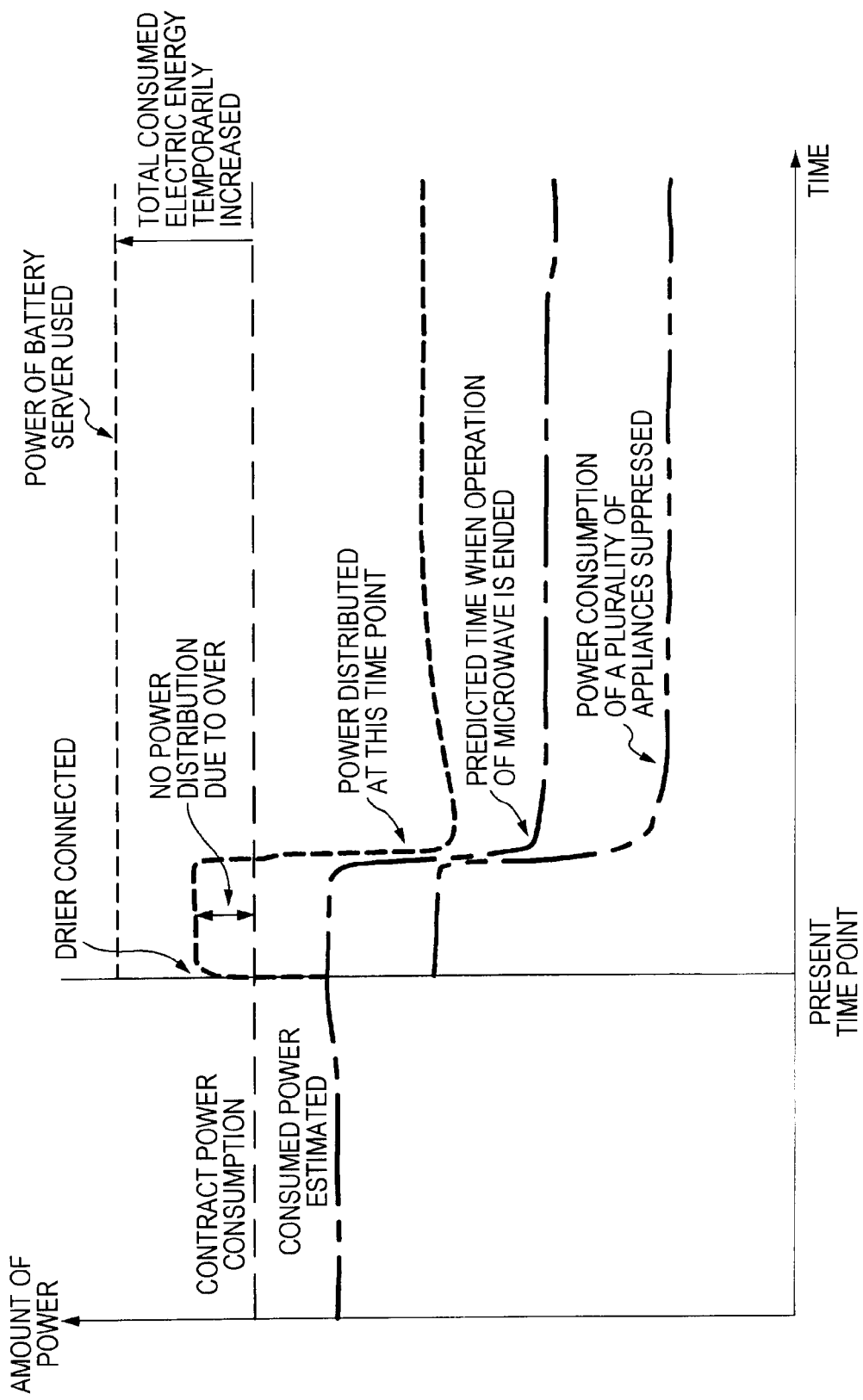
FIG. 4 is an illustrative diagram showing a graph for an example of changes in power consumption according to time passage in the electricity distribution system according to an embodiment of the present disclosure.

FIG. 4 is an illustrative diagram showing a graph for an example of changes in power consumption according to time passage in the electricity distribution system 10 according to an embodiment of the present disclosure. An electric device that consumes a large amount of power, such as a dryer, is connected to the smart sockets 190a to 190e, for example, when the consumed power expectation measured by the intelligent distribution board 160 is under the contract power consumption. Further, when the expected power consumption is above the contract power consumption by connecting the dryer, the intelligent distribution board 160 does not supply electricity to the drier. This is because the power consumption is above the contract power consumption and the breaker trips, due to connection of the dryer.

However, there may be an electric device that temporarily stops the operation in the electric devices that are used now. For example, when a microwave oven is used, food may be finished being warmed after several minutes. In this case, when the operation of the microwave is finished, the power consumption correspondingly decreases, such that the intelligent distribution board 160 supplies electricity to the dryer at this time point. Therefore, when the dryer is available, the user can use the dryer without a specific operation.

Further, although the expected power consumption is above the contract power consumption due to connection of the dryer, when the power of the battery server 150 is used, the total amount of available power temporarily increases, such that only the amount of power under the total amount of available power may be consumed, even though the dryer is connected. In this case, the intelligent distribution board 160 supplies electricity to the dryer by controlling the power conditioner 140 or directly using the power accumulated in the battery server 150.

As described above, the intelligent distribution board 160 ascertains the power consumption of the electric devices connected to the smart sockets 190a to 190e, and when electric devices are connected to the smart sockets 190a to 190e, it determines whether to supply electricity to the connected electric devices from whether the power consumption is above the contract power consumption.

Figure 5:
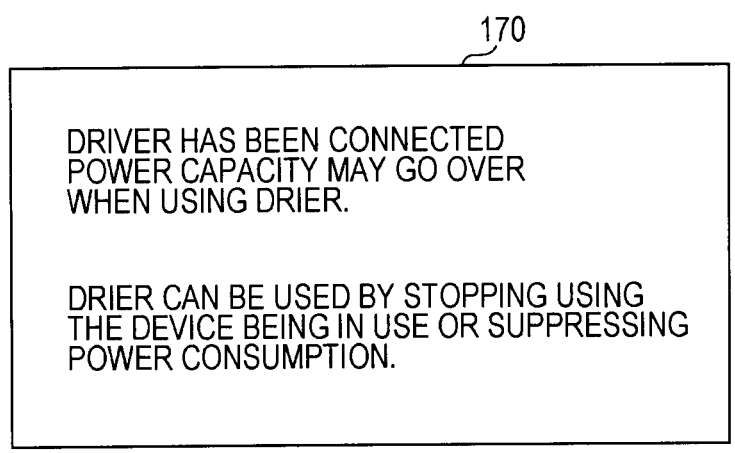
FIG. 5 is an illustrative diagram showing an example of information displayed on an interior display device.

FIG. 5 is an illustrative diagram showing an example of information displayed on an exterior display device 170. When sensing that a dryer is connected to the smart sockets 190a to 190e, the intelligent distribution board 160 displays information on the interior display device 170. As described above, when the information is displayed, it may be notified with a sound.

A user of the electricity distribution system 10 operates the operation board 171, if necessary, when receiving an instruction saying that electricity may not be supplied. In this case, it may be possible to transmit an instruction of supplying electricity, using the power of the battery server 150. Further, it may be possible to create an instruction of supplying electricity by suppressing the power consumption of other devices. In the latter case, it may be possible to supply electricity to a desired device by adjusting the temperature of an air conditioner/refrigerator, the luminance of a television/lighting device, the operation speed of a washing machine, and the operation speed of the charging of an electric vehicle. Further, it may be possible to instruct those in advance to be automatically processed. For example, it may be possible to provide a setting for automatically using the power of the battery server when power is insufficient, and nevertheless, if insufficient, adjusting the temperature of a refrigerator or an air conditioner, decreasing the luminance of a lighting device/television, and extending the charging process of an electric vehicle.

Next, the operation of the electricity distribution system 10 according to an embodiment of the present disclosure is described.

2-2. Operation of Electricity Distribution System

Figure 6:
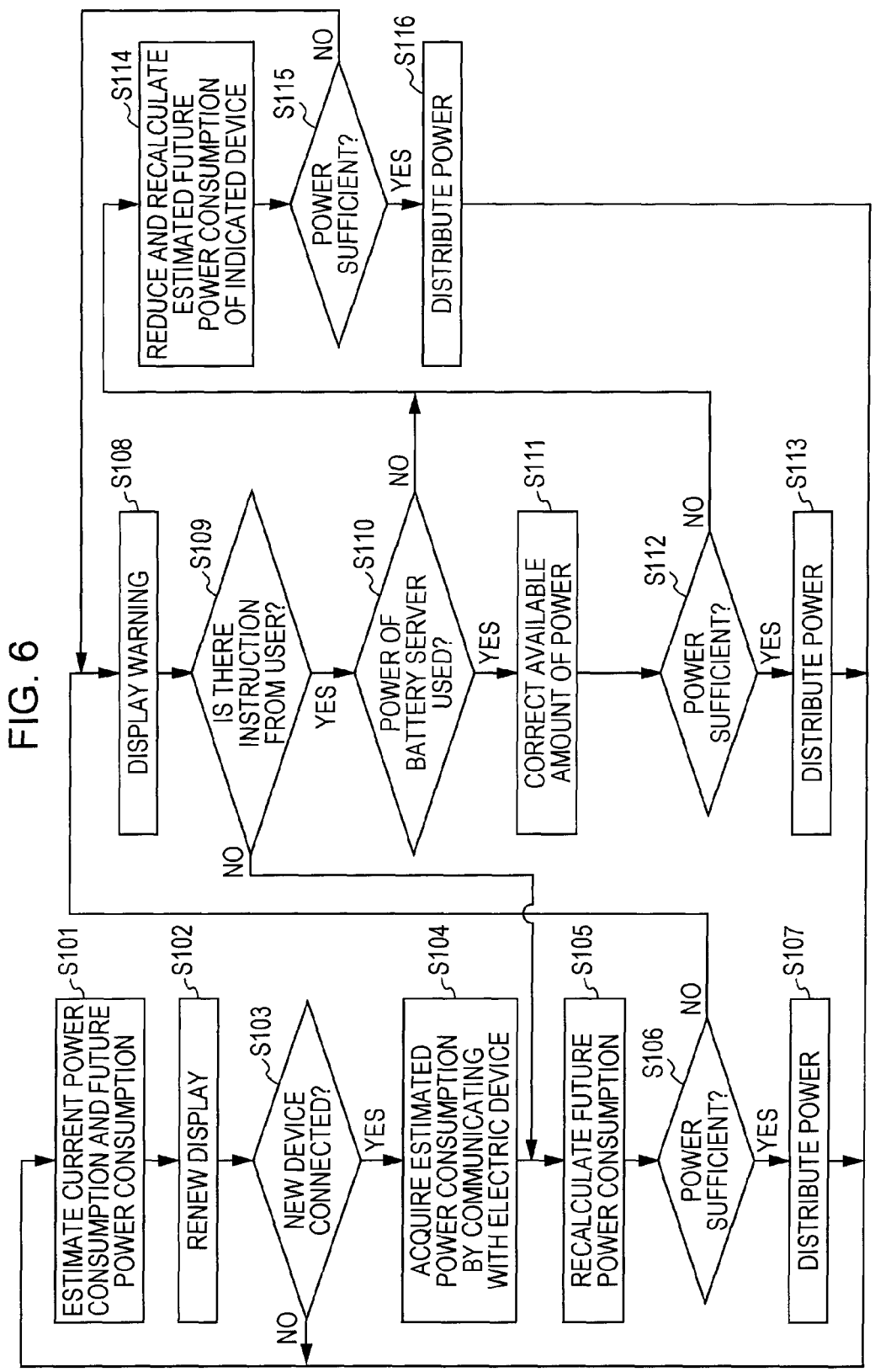
FIG. 6 is a flowchart showing the operation of the electricity distribution system according to an embodiment of the present disclosure.

FIG. 6 is a flowchart showing the operation of the electricity distribution system 10 according to an embodiment of the present disclosure. Hereinafter, the operation of the electricity distribution system 10 according to an embodiment of the present disclosure is described by using FIG. 6.

The intelligent distribution board 160 estimates the present consumption of power and the future consumption of power by ascertaining the operation situations of the appliances 191a and 191b connected to the smart sockets 190a to 190e (Step S101).

In Step S101, when the intelligent distribution board 160 estimates the present consumption of power and the future consumption of power, the intelligent distribution board 160 displays the estimated consumption of power on the interior display device 170 and the interior display device 170 renews the display of the consumption of power (Step S102).

In Step S102, when the interior display device 170 renews the display of the consumption of power, the intelligent distribution board 160 determines whether a new electric device corresponding to the smart socket is connected to the smart sockets 190a to 190e (Step S103).

When a new electric device is not connected, as a result of the determination in Step S103, the process returns to Step S101 and the intelligent distribution board 160 continues estimating the present consumption of power and the future consumption of power. On the other hand, when a new electric device is connected, as a result of the determination in Step S103, the intelligent distribution board 160 communicates with the newly-connected electric device through a wire and acquires estimated power consumption from the electric device (Step S104).

In Step S104, when the intelligent distribution board 160 acquires estimated power consumption from the newly-connected electric device, next, the intelligent distribution board 160 recalculates the future power consumption (Step S105).

Further, in Step S105, when the intelligent distribution board 160 recalculates the future power consumption, the intelligent distribution board 160 determines whether power is sufficient for the power consumption estimated in Step S105 (Step S106).

As the result of the determination in Step S106, when it is determined that the power is sufficient for the power consumption estimated in Step S105, the intelligent distribution board 160 supplies electricity to the newly-connected electric device in Step S103 (Step S107) and the process returns to Step S101. On the other hand, as the result of the determination in Step S106, when it is determined that the power is not sufficient for the power consumption estimated in Step S105, the intelligent distribution board 160 makes the interior display device 170 displays a warning saying that the power is insufficient. The interior display device 170 displays a warning saying that the power is insufficient (Step S108).

In Step S108, when the interior display device 170 displays a warning saying that the power is insufficient, next, the intelligent distribution board 160 determines whether there is an instruction from the user by the operation board 171 (Step S109).

As the result of the determination in Step S109, when the operation board 171 determines that there is no instruction from the user, the process returns to Step S105 and the intelligent distribution board 160 recalculates the future power consumption. On the other hand, as the result of the determination in Step S109, when the operation board 171 determines that there is instruction from the user, next, the intelligent distribution board 160 determines whether to use the power accumulated in the battery server 150 (Step S110).

For whether to use the power accumulated in the battery server 150 when it is expected that the power is insufficient, it may be set in the intelligent distribution board 160 to use the power accumulated in the battery server 150 when it is expected that the power is insufficient in advance, in which an instruction from the user may not be received in Step S109. Further, as shown in the embodiment, the user may be allowed to make an appropriate selection (Step S109) when it is expected that the power is insufficient.

As the result of the determination of Step S110, when it determined that the power accumulated in the battery server 150 is used, the intelligent distribution board 160 corrects the amount of available power in consideration of the power accumulated in the battery server 150 (Step S111).

In Step S111, when the intelligent distribution board 160 corrects the amount of available power in consideration of the power accumulated in the battery server 150, next, it is determined whether the power is sufficient for the corrected amount of available power (Step S112).

As the result of the determination in Step S112, when it is determined that the power is sufficient for the corrected amount of available power, power supply of the battery server 150 is started, electricity is supplied to the newly-connected electric device in Step S103 (Step S113), and the process returns to Step S101. On the other hand, as the result of the determination in Step S112, when it is determined that the power is not sufficient for the corrected amount of available power, or when it is determined that the power accumulated in the battery server 150 is not used in Step S110, the intelligent distribution board 160 reduces and recalculates the future estimated power consumption of the electric device indicated from the user by the operation board 171 (Step S114). Further, the indicated electric device is an air conditioner/refrigerator, a television, a lighting device, a washing machine, an electric vehicle, or the like.

In Step S114, when the intelligent distribution board 160 reduces and recalculates the estimated future power consumption of the electric device indicated from the user by the operation board 171, next, it is determined whether the power is sufficient for the recalculated estimated power consumption (Step S115). Further, the indication from the user may be provided in advance or may be performed every time insufficient power is ascertained.

As the result of the determination in Step S115, when it is determined that the power is sufficient for the recalculated estimated power consumption, the power consumption of the electric device indicated from the user (in advance) is reduced, and then, electricity is supplied to the newly-connected electric device in Step S103 (Step S113), and the process returns to Step S101. On the other hand, as the result of the determination in Step S115, when the power is insufficient for the recalculated estimated power consumption, the process returns to Step S108, and the intelligent distribution board 160 makes the interior display device 170 display a warning saying that the power is insufficient and the interior display device 170 displays a warning saying that the power is insufficient.

Further, all the electric devices (for example, electric devices A, B, and C) indicated (in advance) by the user are not necessarily objects, it may be possible to reduce the consumed power of the minimum necessary devices (for example, only the electric devices A and B in the electric devices A, B, and C) (reduced by 20% only for the electric devices A and B), or it may be possible to reduce the consumed power of all the devices (for example, the electric devices A, B, and C) to the minimum necessary (for example, reduced by 10% for the electric devices A, B, and C).

As described above, as the electricity distribution system 10 according to an embodiment of the present disclosure operates, it is determined whether power is sufficient within the amount of available power even if power is supplied to electric devices when electric devices corresponding the smart sockets are connected to the smart socket 190*a* to 190*e*, and then, when the power is insufficient, an appropriate warning is displayed or the consumed power of the electric devices that are used now is reduced. Accordingly, it is possible to reduce the user's burden by appropriately determining power excess and deficiency, which depends on the user's estimation or intuition in the related art.

Further, when electric devices that do not correspond to smart sockets are connected to the smart sockets 190*a* to 190*e*, the intelligent distribution board 160 may temporarily supply electricity to the devices, but may stop supplying electricity to a device which is found to be exceeding the contract power consumption, and make the interior display device 170 display a warning to this effect. Alternatively, the intelligent distribution board 160 may input the actual power consumption to the user and calculate the expected power consumption from the value, every time electric devices that do not correspond to the smart sockets are connected to the smart sockets 190*a* to 190*e*.

3. CONCLUSION

As described above, according to the electricity distribution system 10 of an embodiment of the present disclosure, the intelligent distribution board 160 keeps calculating the present power consumption and the future power consumption. Further, when electric devices corresponding to smart sockets are connected to the smart sockets 190*a* to 190*e*, the intelligent distribution board 160 determines whether the amount of available power will be exceeded by supplying electricity to corresponding electric devices.

Further, when the amount of available power is not exceeded even if power is supplied to the corresponding electric devices, the intelligent distribution board 160 keeps supplying electricity to the corresponding electric devices, and when the amount of available power is exceeded by supplying the electricity to the corresponding electric devices, the intelligent distribution board 160 does not supply electricity to the corresponding electric devices or temporarily increases the amount of available power by using the power of the battery server 150, or supplies electricity to the corresponding electric device when the amount of available power is not exceeded even if electricity is supplied to the corresponding devices.

Accordingly, the electricity distribution system 10 according to an embodiment of the present disclosure can reduce the user's burden by appropriately determining power excess and deficiency, which depends on the user's estimation or intuition in the related art. Further, there is a problem in an electricity distribution system of the related art in that the breaker is forced to trip when the amount of available power is exceeded and the electric devices with the power supply stopped are reset, such that the records that are being processed are lost. However, in the electricity distribution system 10 according to an embodiment of the present disclosure, since it is determined whether the amount of available power will be exceeded, before supplying electricity, it is possible to avoid the problem that the electric devices with the power supply stopped are reset, such that the records that are being processed are lost.

The present disclosure contains subject matter related to that disclosed in Japanese Priority Patent Application JP 2010-270439 filed in the Japan Patent Office on Dec. 3, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electricity distribution system comprising:
an electricity supply control unit that receives information on power consumption from an electric device that is electrically connected, estimates the current and the future power consumption, and controls the supply of electricity to the electric device;
an information display unit that displays information on a power use situation of the electric device electrically connected with the electricity supply control unit; and
a battery server that accumulates power,
wherein the electricity supply control unit communicates the information on the power consumption with a new electric device when the new electric device is electrically connected, and when the amount of available power is exceeded by supplying electricity to the electric device, does not supply electricity to the electric device, makes the information display unit display that the amount of available power is exceeded by supplying electricity to the information display unit, and determines whether to use the power accumulated in the battery server.

2. The electricity distribution system according to claim 1, further comprising a charging/discharging control unit that controls charging/discharging of the battery server,
wherein the electricity supply control unit controls the charging/discharging control unit to use the power accumulated in the battery server when determining that the amount of available power is exceeded by supplying electricity to the electric device, as a result of communicating the information on the power consumption with a new electric device when the new electric device is electrically connected.

3. The electricity distribution system according to claim 1, wherein the electricity supply control unit communicates the information on the power consumption with a new electric device when the new electric device is electrically connected, and when the amount of available power would be exceeded by supplying electricity to the electric device, starts to supply power to a new electric device when the amount of available power is not exceeded even though the power consumption of the electric device currently electrically connected decreases and electricity is supplied to the new electric device.

4. The electricity distribution system according to claim 1, wherein the electricity supply control unit communicates the information on the power consumption with a new electric device when the new electric device is electrically connected, and performs control for decreasing the power consumption of the electric device currently electrically connected, when the amount of available power is exceeded by supplying electricity to the electric device.

5. The electricity distribution system according to claim 1, wherein the battery server accumulates power generated by a power generator that generates electricity, using natural energy.

6. The electricity distribution system according to claim 5, wherein a plurality of power generators is included and the power generators are each equipped with a boosting device making the power generated from the plurality of power generators uniform at predetermined power.

7. An electricity distribution method comprising:
receiving information on power consumption from an electric device that is electrically connected, estimating the current and the future power consumption, and controlling the supply of electricity to the electric device; and
displaying information on a power use situation of the electric device electrically connected with the electricity supply control unit;
wherein, in the controlling of the supply of electricity, the information on the power consumption is communicated with a new electric device when the new electric device is electrically connected, and when the amount of available power is exceeded by supplying electricity to the electric device, does not supply electricity to the electric device, displays that the amount of available power is exceeded by supplying electricity in the displaying of information, and determines whether to use power accumulated in the battery server that accumulates power.

* * * * *